United States Patent [19]

Saitoh et al.

[11] Patent Number: 5,386,223
[45] Date of Patent: Jan. 31, 1995

[54] METHOD OF APPARATUS FOR RECORDING COLOR IMAGE BY OVERLAPPING TONER IMAGES OF DIFFERENT COLORS

[75] Inventors: Masahiko Saitoh, Kitaibaraki; Hiroyuki Tadokoro, Hitachi, both of Japan

[73] Assignee: Hitachi, Ltd., Tokyo, Japan

[21] Appl. No.: 4,647

[22] Filed: Jan. 14, 1993

Related U.S. Application Data

[63] Continuation of Ser. No. 594,976, Oct. 10, 1990, abandoned.

[30] Foreign Application Priority Data

Oct. 12, 1989 [JP] Japan .................................. 1-264002

[51] Int. Cl.$^6$ ........................ G01D 15/06; H04N 5/272
[52] U.S. Cl. ........................................ 346/157; 358/528
[58] Field of Search ................. 382/47; 355/218, 244, 355/326, 328; 358/450, 77, 80, 528; 346/157

[56] References Cited

U.S. PATENT DOCUMENTS

| | | | |
|---|---|---|---|
| 4,583,116 | 4/1986 | Hennig | 358/75 |
| 4,931,861 | 6/1990 | Taniguchi | 358/75 |
| 5,012,300 | 4/1991 | Levanon et al. | 355/328 |
| 5,034,778 | 7/1991 | Levanon et al. | 355/328 X |

FOREIGN PATENT DOCUMENTS

| | | |
|---|---|---|
| 0096084 | 12/1983 | European Pat. Off. . |
| 0160526 | 6/1985 | European Pat. Off. . |
| 0251278 | 7/1988 | European Pat. Off. . |
| 0322680 | 5/1989 | European Pat. Off. . |

Primary Examiner—Benjamin R. Fuller
Assistant Examiner—Randy W. Gibson
Attorney, Agent, or Firm—Antonelli, Terry, Stout & Kraus

[57] ABSTRACT

A method of recording a color image in such a manner that two toner images of different colors are formed on the basis of video signals supplied from an information processor for producing different colors, and the toner images are transferred to a sheet of recording paper so that the toner images overlap each other, is disclosed, in which method video signal portions for forming contiguous toner images of different colors at a recording position are extracted from the video signals, and one of the video signal portions is extended so that the toner image based upon the video signal portion is enlarged in the direction of the boundary between the contiguous toner images based upon the video signal portions, to prevent a gap having the ground color of the recording paper from generating between the contiguous toner images even when one of the contiguous toner images is spaced apart from the other toner image.

4 Claims, 9 Drawing Sheets

METHOD OF APPARATUS FOR RECORDING COLOR IMAGE BY OVERLAPPING TONER IMAGES OF DIFFERENT COLORS

This application is a continuation of Ser. No. 07/594,976, filed Oct. 10, 1990, now abandoned.

BACKGROUND OF THE INVENTION

The present invention relates to a method of and an apparatus for recording a color image, and more particularly to a method of and an apparatus for recording a color image on the basis of a color video signal which is used in information processing apparatuses such as a computer, a word processor and a color image reader.

In a color image recording apparatus for recording a color image which is used in information processing apparatuses such as a computer, a word processor and a color image reader, by utilizing electrophotographic techniques, a plurality of toner images of of different colors are formed on a primary recording medium independently of each other, and these toner images are then transferred to a secondary recording medium so that the toner images overlap each other, to form a color image on the secondary recording medium.

In a general apparatus for recording an image by utilizing electrophotographic techniques, the surface of a photoconductive, light-sensitive drum is uniformly charged with, the charged surface of the drum is exposed to light in accordance with a video signal to form an electrostatic latent image, the latent image is developed to form a toner image, and the toner image is transferred to recording paper. In order to record a color image in the above-mentioned manner, the surface of the photoconductive, light-sensitive drum is uniformly charged with electricity, the electrified surface of the drum is exposed to light in accordance with a video signal which produces a first color, to form an electrostatic latent image, the latent image is developed by a developing device for the first color, to form a toner image of the first color, and the toner image is transferred to recording paper. Then, the surface of the drum is again charged uniformly with electricity, the electrified surface of the drum is exposed to light in accordance with a video signal which produces a second color, to form an electrostatic latent image, the latent image is developed by a developing device for the second color, to form a toner image of the second color, and the toner image of the second color is transferred to the recording paper so that the toner image of the first color and the toner image of the second color overlap each other on the recording paper. A toner image of a third color can be formed and transferred in the above-mentioned manner, if necessary.

In order to expose the surface of the photoconductive, light-sensitive drum to light in accordance with a video signal used in an information processor, a laser beam emitted from a semiconductor laser which is turned on and off in accordance with the video signal, is usually incident on the surface of the drum.

In such a color image recording apparatus, there arises the following problem. That is, it is very difficult to form toner images which have different colors and are to be transferred to a sheet of recording paper, on the surface of a photoconductive, light-sensitive drum so that the toner images are accurately located in relation to each other. In more detail, it is very difficult to rotate the photoconductive, light-sensitive drum uniformly. Hence, it is difficult to accurately locate a second toner image on the surface of the drum in relation to a first toner image on the surface of the drum. Thus, the toner images deviate from each other in the rotational direction of the drum. When two contiguous toner images of different colors on the recording paper are deviated from each so that the toner images are separated, a white gap (that is, a gap having the base color of the recording paper) is generated in the running direction of the recording paper. Thus, the picture quality of the toner images transferred to the recording paper is deteriorated.

A color image recording apparatus of this kind is described in the 1989-5-15 issue of a Japanese publication "Nikkei Mechanical".

SUMMARY OF THE INVENTION

It is an object of the present invention to provide a method of recording a color image so that a gap having the base color of recording paper is never generated between two images of different colors which are to be contiguous to each other, and to provide an apparatus for realizing the method.

In order to attain the above object, according to a first aspect of the present invention, there is provided a method of recording a color image in such a manner that two toner images of different colors are formed on the basis of video signals supplied from an information processor for producing different colors, and the toner images are transferred to a sheet of recording paper so that the toner images overlap each other, to form the color image, in which method video signal portions for forming contiguous toner images of different colors at a recording position are extracted from the video signals, and one of the video signal portions is extended so that the toner image based upon the video signal portion is enlarged in the direction of the boundary between the contiguous toner images based upon the video signal portions.

Further, according to a second aspect of the present invention, there is provided an apparatus for recording a color image in such a manner that two toner images are formed on the basis of video signals supplied from an information processor for producing different colors, and the toner images are transferred to a sheet of recording paper so that the toner images overlap each other, to form the color image, which apparatus comprises: video signal storing means for storing video signals supplied from the information processor and used for forming two toner images of different colors; contiguous pixel pair detecting means for extracting video signal portions capable of forming contiguous toner images of different colors at a recording position, from the video signals stored in the video signal storing means; video signal modifying means for extending one of the video signal portions so that the toner image based upon the video signal portion is enlarged in the direction of the boundary between the contiguous toner images based upon the video signal portions, to modify at least one of the video signals stored in the video signal storing means; and image forming means for forming toner images on the basis of video signals including the modified one.

As mentioned above, according to the present invention, one of video signal portions for forming contiguous toner images of different colors at a recording position is extended so that the toner image based upon the video signal portion is enlarged in the direction of the boundary between the contiguous toner images. Thus, even when the contiguous toner images of different colors are deviated from each other so that the contiguous toner images are separated, there is no fear of generating a gap between the contiguous toner images.

DESCRIPTION OF THE PREFERRED EMBODIMENT

An embodiment of the present invention will be explained below, with reference to the drawings.

Figure 1:
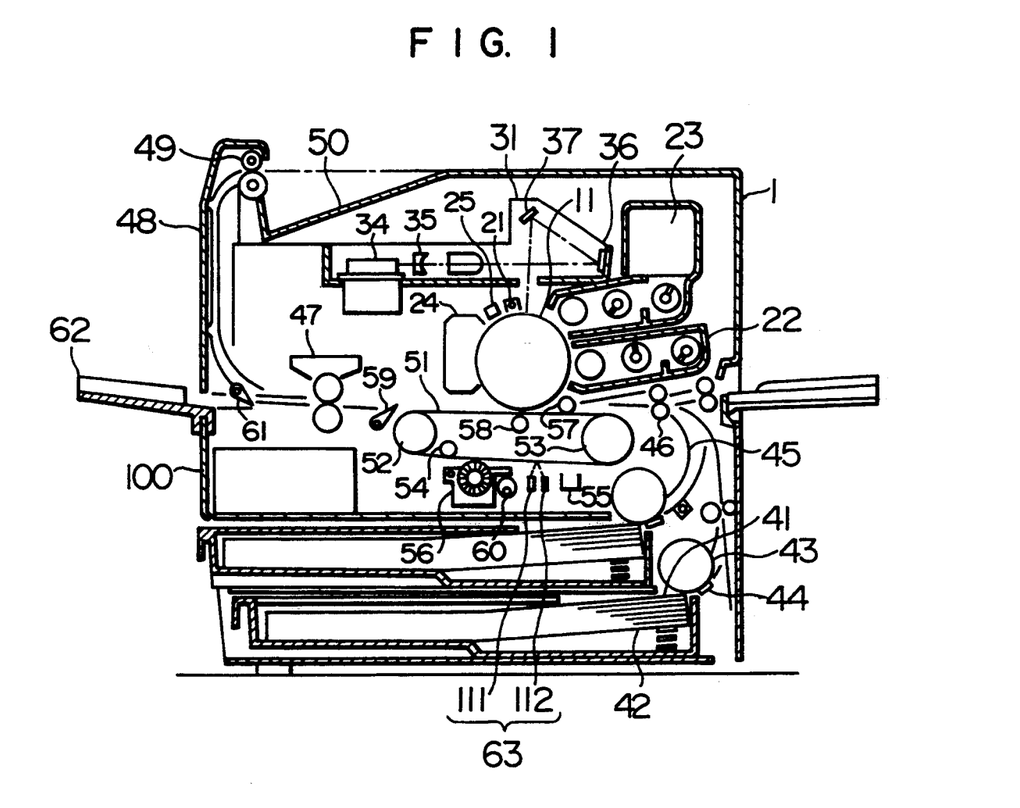
FIG. 1 is a sectional view showing a two-color image recording apparatus proper utilizing electrophotographic techniques.
Figure 2:
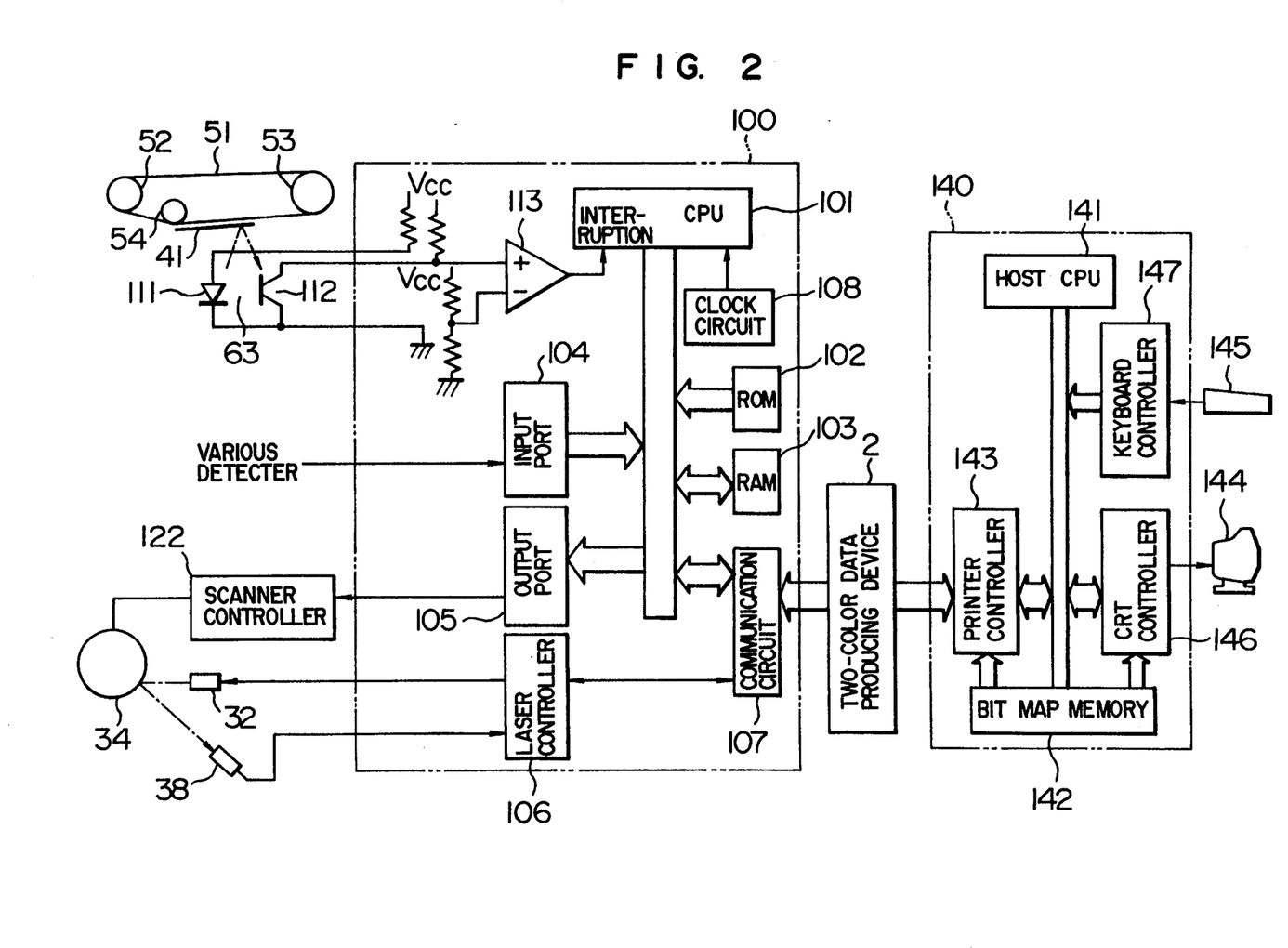
FIG. 2 is a block diagram showing an embodiment of a two-color image recording system according to the present invention which embodiment includes the two-color image recording apparatus proper of FIG. 1.

FIGS. 1 and 2 show an embodiment of a two-color image recording system according to the present invention. Referring to FIGS. 1 and 2, a photoconductive, light-sensitive drum 11 is rotatably disposed in a central portion of a two-color image recording apparatus housing 1. Further, an electrifying device 21, a first developing device (for example, black toner developing device) 22, a second developing device (for example, red toner developing device) 23, a cleaner 24 and an erasing lamp 25 are arranged along the outer circumference of the drum 11 so that each of the members 21 to 25 confronts the outer circumference of the drum 11. The second developing device 23 is detachably fixed to the recording apparatus housing 1, and thus can be replaced by a developing device using a toner of a different color.

A transfer belt 51 for electrostatically attracting recording paper 41 to carry the paper 41 is disposed under the light-sensitive drum 11. The transfer belt 51 is stretched around the outer circumference of each of a drive roller 52, a driven roller 53 and an adjusting roller 54, and is electrically driven so that the transfer belt 51 and the outer circumference of the drum 11 have the same running speed. The total length of the transfer belt 51 is made greater than the length of the largest recording paper used (in a running direction thereof). A belt electrifying device 55, a belt cleaner 56, an electrification assisting roller 57, a transfer assisting roller 58 and a recording-paper separating claw 59 are disposed along the outer periphery of the transfer belt 51. The position of the belt cleaner 57 is controlled by a cam 60 so that the belt cleaner 57 does not act on the transfer belt 51 and the recording paper for a period when the recording paper 41 is electrostatically attracted by the transfer belt 51 and thus rotated together with the transfer belt 51. A recording-paper detecting device 63 made up of a light emitting diode 111 and a light receiving element 112 is disposed under the transfer belt 51. The detecting device 63 generates a detection signal at a time the recording paper moving with the transfer belt 51 and the detecting device 63 face each other.

A laser exposure device 31 is disposed in an upper portion of the two-color image recording apparatus 1. The laser exposure device 31 includes therein a semiconductor laser diode 32, a coupling lens (not shown), an electrically driven scan mirror 34, an $F\theta$ lens 35 and reflecting mirrors 36 and 37. Thus, the uniformly electrified surface of the light-sensitive drum 11 can be scanned with a laser beam emitted from the exposure device 31, to form an electrostatic latent image. The laser exposure device 31 is further provided with a reflecting mirror (not shown) and a beam detector 38, to detect the passage of the laser beam which has been deflected by the scan mirror 34, through a scan reference position.

A pair of paper feeding cassettes 42 for storing the recording paper 41, a pair of paper feeding rollers 43 for extracting one sheet of recording paper from each paper feeding cassette, and a pair of separation belts 44 for separating one sheet of recording paper from a plurality of sheets of paper which are simultaneously extracted from each paper feeding cassette, are all disposed in a bottom portion of the two-color image recording apparatus 1. It is to be noted that the paper feeding cassettes 42 are detachably fixed to the above bottom portion. The recording paper 41 extracted by a paper feeding roller 43 is led to a register roller 46 through a turning-over roller 45. The register roller 46 corrects the attitude of the carried recording paper 41, and adjusts a position where an image is first written (that is, carries out registration). The recording paper 41, to which a plurality of toner images of different colors have been transferred, is separated from the transfer belt 51 by the recording-paper-separating claw 59, and then passes through a fixing device 47 to fuse the toner images so that the toner images are fixed to the recording paper 41. A direction changeover lever 61 is used for changing the running direction of the recording paper 41 having passed through the fixing device 47, from one of a direction toward an upper paper tray 50 through a paper discharge guide 48 and a paper discharge roller 49 and a direction toward a side paper tray 62, to the other direction.

Further, the two-color image recording apparatus 1 includes a motor (not shown) for driving the light-sensitive drum 11 and the transfer belt 51, a, motor (not shown) for driving the developing devices 22 and 23, and a motor (not shown) for driving the paper feeding roller 43 and the fixing device 47.

As shown in FIG. 2, the control part 100 of the recording apparatus 1 includes a central processing unit (CPU) 101, a read only memory (ROM) 102, a random access memory (RAM) 103, an input port 104 for receiving signals from various detectors, an output port 105 for delivering signals which are used for controlling the supply of electric power to the motors and other devices, a communication circuit 107 for communicating with an information processor through a two-color data producing device 2 which will be explained later in detail, a clock circuit 108 for generating a clock signal which serves as a reference signal for the operation of the CPU 101, and a comparator 113 for supplying an interrupt signal of the TTL level to the CPU 101.

The ROM 102 stores therein a series of programs executed by the CPU 101 for controlling the operation of the recording apparatus proper 1. The programs includes a mono-color mode and a two-color mode.

The recording apparatus 1 is provided with dedicated circuits such as a scanner controller 122 for keeping the drive motor of the electrically-driven scan mirror 34 at a constant speed, in addition to the control part 100.

The information processor 140 includes a host CPU 141, a bit map memory 142 for storing image information which is to be recorded, in the form of pixel data, a printer controller 143 for controlling the recording apparatus proper 1 through the two-color data producing device 2, a CRT display 144 connected to the bit map memory 142 through a CRT controller 146, and a keyboard 145 connected to the host CPU 141 through a keyboard controller 147.

Figure 5:
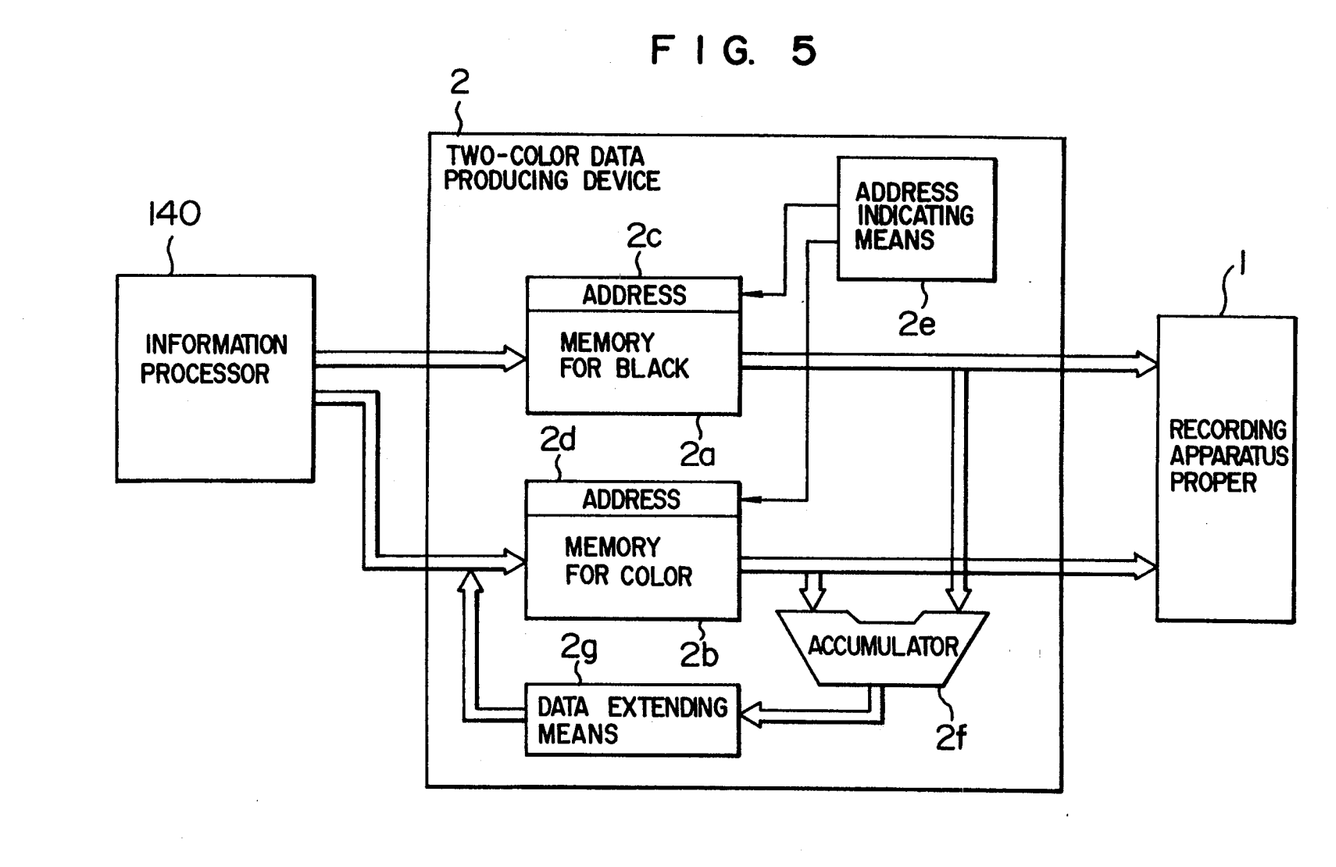
FIG. 5 is a block diagram showing a two-color data producing device included in the embodiment of FIG. 2.

As shown in FIG. 5, the two-color data producing device 2 includes two memories 2a and 2b for receiving and storing image data which is distributed on the bit map memory 142 of the information processor 140 to produce a black image, and image data which is distributed on the bit map memory 142 to produce a color image (for example, a red image), access address generators 2c and 2d for the memories 2a and 2b, address indicating means 2e for indicating addresses which are used to read out data portions for forming contiguous toner images of different colors at a recording position, an accumulator 2f for checking whether or not the read-out data portions can produce contiguous pixels of different colors, data extending means 2g for extending the data portion corresponding to a red toner image so that the red toner image based upon the above data portion is enlarged in the direction of the boundary between the contiguous toner images, and for storing a supplementary data portion which is obtained by the data extension, in the memory 2b together with the original image data, and a control circuit (not shown) for controlling the members 2a to 2g.

Next, the image recording operation of the two-color image recording system in a two-color mode will be explained below with reference to FIGS. 3 and 4, by way of example.

When a power source is turned on, the CPU 101 included in the control part 100 of the recording apparatus 1 waits for a recording instruction which includes a mode signal for discriminating between a mono-color mode and a two-color mode, while keeping the fixing device 47 at a predetermined temperature.

When the recording (namely, printing) of a composition or figure is indicated by operating the keyboard 145, the host CPU 141 separates data which indicates the composition or figure into image data for forming a black toner image and image data for forming a red toner image, and distributes (or developes) each image data on the bit map memory 142. When the development of the image data has been completed, the host CPU 141 issues a recording instruction which includes a mode signal for discriminating between the mono-color mode and the two-color mode, to the two-color data producing device 2 through the printer controller 143. In the mono-color mode, image data to be recorded is sent from the two-color data producing device 2 to the recording apparatus 1, as it is, and then the two-color data producing device 2 issues the recording instruction to the recording apparatus 1. In the two-color mode, the two-color data producing device 2 operates in a control mode for sending image data which has been subjected to data extension, to the recording apparatus 1, and issues the recording instruction to the recording apparatus 1 after predetermined processing has been carried out.

Figure 3:
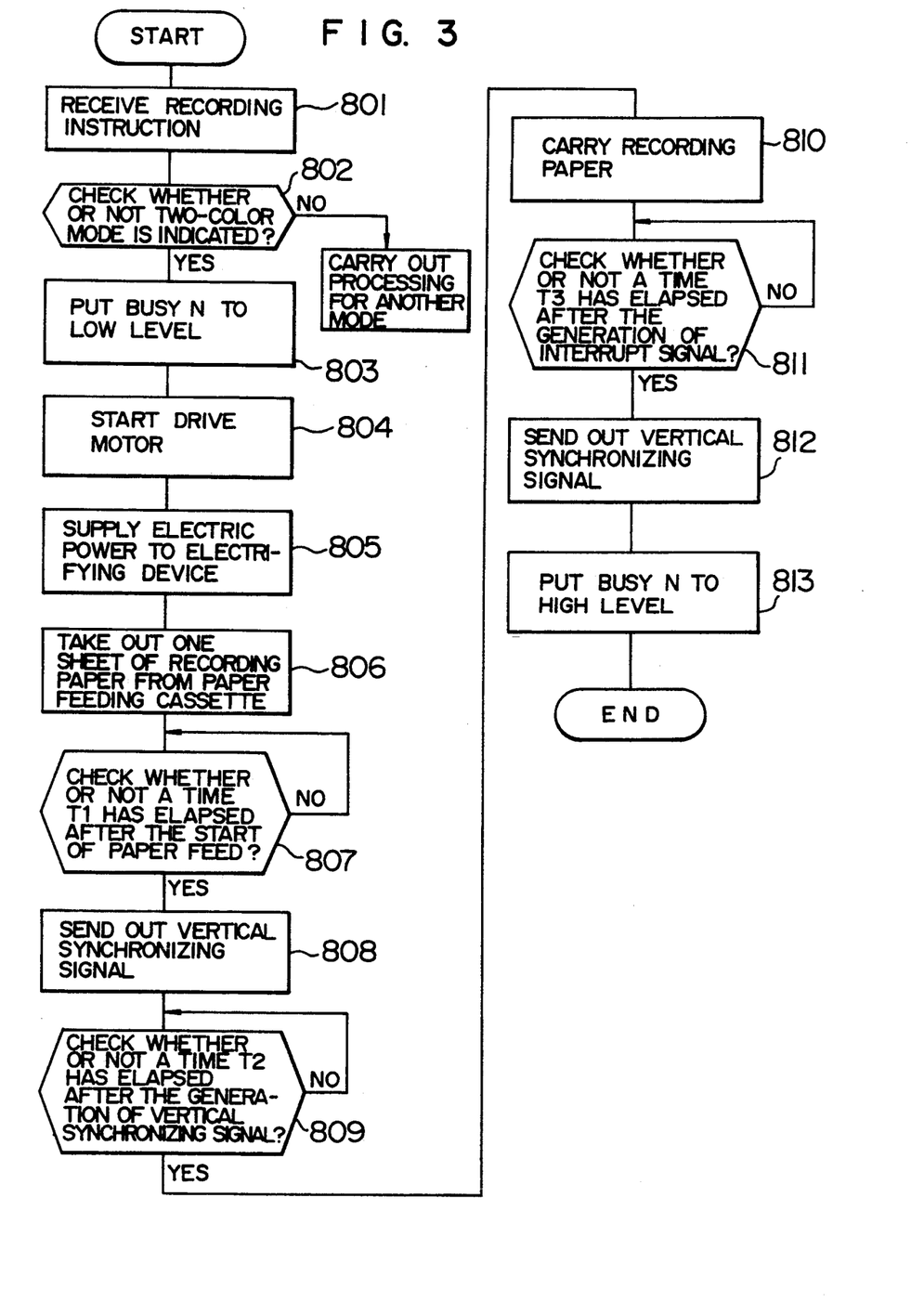
FIG. 3 is a flow chart for explaining the recording control processing carried out by the control circuit of the two-color image recording apparatus proper of FIG. 1.
Figure 4:
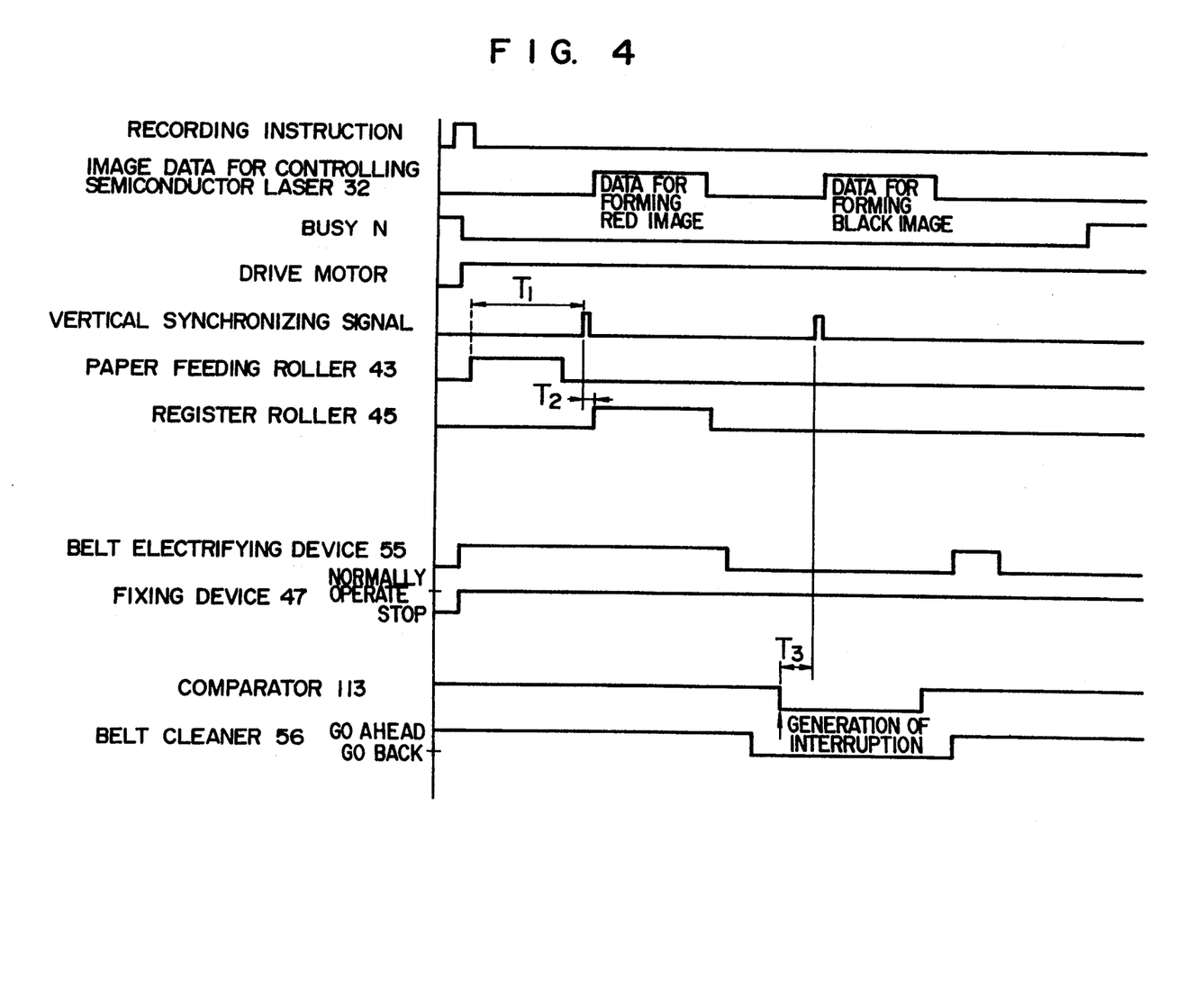
FIG. 4 is a waveform chart for indicating the timing of each of various operations included in the control processing of FIG. 3.

Referring now to FIGS. 3 and 4, the CPU 101 included in the control part 100 of the recording apparatus 1 receives the recording instruction (step 801). Then, it is checked whether or not the mode signal included in the recording instruction indicates the two-color mode (step 802). When the mode signal indicates the two-color mode, a Busy N is put to a low level (step 803). Various drive motors are started (step 804), and the supply of electric power to various electrifying devices and other elements is started (step 805). Then, a sheet of recording paper 41 is extracted from the paper feeding cassette 42, to be sent to the register roller 45 (step 806). It is checked whether or not a predetermined time T1 has elapsed after the start of paper feed (step 807). When it is judged that the predetermined time T1 has elasped, the CPU 101 sends a vertical synchronizing signal for recording a toner image of a first color, for example, a red toner image (that is, a reference signal for indicating the starting position of the red toner image recording area), to the two-color data producing device 2 (step 808).

After having received the vertical synchronizing signal, the two-color data producing device 2 first sends image data which is used for forming a red toner image, to the recording apparatus 1, while using a signal from the beam detector 38 as a horizontal synchronizing signal (that is, a reference signal for indicating the starting position of each scanning line.

The laser controller 106 of the recording apparatus proper 1 turns the semiconductor laser diode 32 on or off in accordance with the image data for forming the red toner image. The laser beam emitted from the semiconductor laser diode 32 is converted by the coupling lens into parallel light rays, which are deflected by the electrically-driven scan mirror 34, and then focused on the surface of the light-sensitive drum 11 through the F0 lens 35 and the reflecting mirrors 36 and 37. The focused laser beam scans the surface of the drum 11, to form an electrostatic latent image. The latent image on the surface of the drum 11 is developed by a red toner stored in the second developing device 23. Thus, a red toner image is formed.

While, the CPU 101 of the recording apparatus 1 checks whether or not a predetermined time T2 has elapsed after the vertical synchronizing signal was sent out (step 809). When the predetermined time T2 has elapsed, the register roller 45 is rotated, to carry the recording paper 11 which has been stopped before the register roller 45 (step 810).

The recording paper 41 thus carried is electrostatically attracted by the transfer belt 51 which has been charged with electricity so as to have a high voltage, and is put in contact with the surface of the drum 11 in a period when the recording paper 41 moves with the transfer belt 51. At this time, the red toner image on the surface of the drum 11 is transferred to the recording paper 41 by the action of the electric field due to electric charges on the transfer belt 51. A red toner which is left on the surface of the drum 11 without being transferred to the recording paper 41, is removed by the cleaner 24, and the electric charge left on the surface of the drum 11 is eliminated by the erasing lamp 25.

The belt cleaner 56 is moved back for a period when the recording paper 41 attracted by the transfer belt 51 passes through a position where the belt cleaner 56 is to be disposed, to prevent the toner image on the recording paper 41 from being destroyed. When the top of the recording paper 41 reaches the position of the recording-paper detector 63, the output signal of the light receiving element 112 is changed, and the output signal of the comparator 113 is put in a low level, to generate an interrupt signal.

When the interrupt signal is applied to the CPU 101, the CPU 101 checks whether or not a predetermined time T3 has elapsed after the generation of the interrupt signal (step 811). When it is confirmed that the predetermined time T3 has elapsed, the CPU 101 sends a vertical synchronizing signal for recording a toner image of a second color (for example, a black toner image) to the two-color data producing device 2 (step 812). The total length of the transfer belt 51 is made greater than the length of the recording paper 41. Hence, the vertical synchronizing signal for recording the toner image of the second color can be sent out after the electrostatic latent image for obtaining the red toner image has been formed.

After having received the vertical synchronizing signal for recording the toner image of the second color, the two-color data producing device 2 sends image data which is used for forming a black toner image, to the recording apparatus 1 while using a signal from the beam detector 38 as a horizontal synchronizing signal (that is, a reference signal for indicating the starting position of each scanning line).

Similarly to a case where the red toner image is formed on the basis of the image data for obtaining the red toner image, the laser controller 106 of the recording apparatus 1 turns the semiconductor laser diode 32 on or off in accordance to the image data for obtaining the black toner image, and the laser beam emitted from the semiconductor laser diode 32 scans the surface of the light-sensitive drum 11 to form an electrostatic latent image. The latent image on the surface of the drum 11 is developed by a black toner stored in the first developing device 22. Thus, a black toner image is formed. The supply of electric power to the belt electrifying device 55 is stopped for a period when the recording paper 41 having the red toner image thereon passes through the position of the belt electrifying device 55. However, electric charges which have been previously given to the transfer belt 15, are kept on the transfer belt 51. Thus, when the recording paper 41 is again put in contact with the surface of the drum 11, the black toner image on the surface of the drum 11 is transferred to the recording paper 41 by the action of the electric charges on the transfer belt 51.

Thereafter, the recording paper 41 having the red and black toner images thereon is separated from the transfer belt 51 by the recording-paper separating claw 59, and then sent to the fixing device 47, to be heated and pressed. Thus, the red and black toner images are fixed to the recording paper 41 by fusion. The recording paper 41 having the fixed toner images is sent to the upper paper tray 50 or side paper tray 62 through the direction changeover lever 61.

When the recording of the black image data is completed, the Busy N signal of the CPU 101 is put to a high level (step 813), and thus the CPU 101 waits for the recording instruction for the next page.

Now, explanation will be made of a case where a plurality of pages of image information are to be recorded. Immediately after the CPU 141 of the information processor 140 has sent out image data on a first page for forming a red toner image, the CPU 141 develops image data on the next page for forming a red toner image, on the bit map memory 142. Further, immediately after image data on the first page for forming a black toner image has been sent out, the CPU 141 develops image data on the next page for forming a black toner image, on the bit map memory 142. When the development of image data for forming red and black toner images, on the bit map memory is completed, the CPU 141 sends out the recording instruction.

In a case where the CPU 101 has not yet received the recording instructions for the next page when the recording paper 41 having toner images reaches the upper or side paper tray, the CPU 101 stops the operation of various motors.

In a case where the same image information is recorded on a plurality of sheets of recording paper, the information processor 140 issues a re-recording instruction to the two-color data producing device 2, to again deliver image data stored in the two-color data producing device 2.

Further, in a case where the mode signal included in the recording instruction indicates the mono-color mode, image data which is supplied from the information processor 140 to the two-color data producing device 2, is sent to the recording apparatus proper 1, as it is. In the recording apparatus 1, a toner image of a single color is formed with the aid of a specified developing device 22 or 23. In this case, it is not required to put a sheet of recording paper 41 in contact with the surface of the drum 11 repeatedly. Hence, the recording paper 41 having the toner image of the single color is separated from the transfer belt 51 by the recording-paper separating claw 59, and then sent to the fixing device 47, in which the toner image is fixed to the recording paper 41 by fusion. The recording paper 41 having the fixed toner image is sent to one of the upper or side paper trays.

In a case where two toner images of different colors are recorded on the recording paper 41, it is very difficult to accurately locate one of two toner images in relation to the other toner image. That is, it is extremely difficult to avoid positioning errors caused by the machining error and assembling error of various members and caused by the expansion or contraction of the members due to changes in temperature and humidity.

According to the present invention, a gap which is formed between contiguous toner images on the basis of the positional deviation of one of the toner images from the other toner image due to the above positioning errors, can be eliminated by the image data extension processing carried out by the two-color data producing device 2.

Figure 6A:
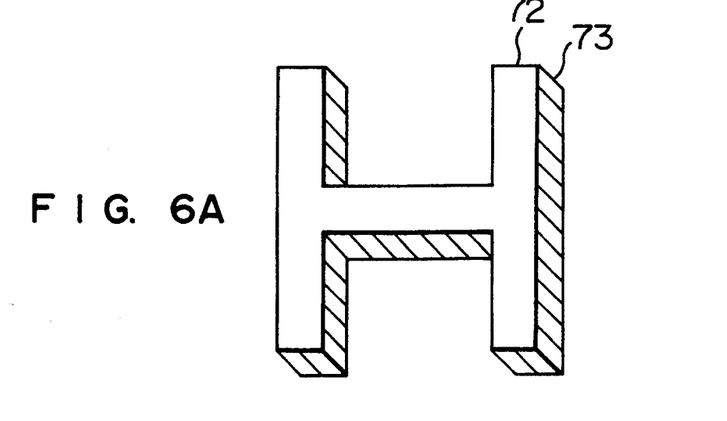
FIGS. 6A to 6B are schematic diagrams showing images of two colors which are formed by an information processor included in the embodiment of FIG. 2, and showing toner images of two colors which are recorded on a sheet of recording paper by the two-color image recording apparatus proper of FIG. 1.
Figure 6B:
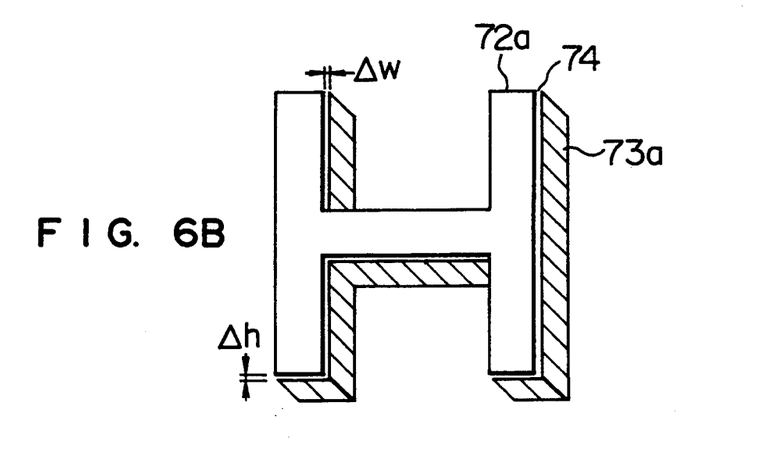

Let us consider a case where contiguous images of different colors are formed by the information processor 140 as indicated by a black image 72 and a red image 73 in FIG. 6A, and the images are to be recorded by the recording apparatus 1. In this case, as shown in FIG. 6B, a gap 74 is generated between two toner images 72a and 73a recorded on the recording paper 41, on the basis of the above positional deviation. Referring to FIG. 6B, the positional deviation Δh in the lengthwise direction is based upon the positioning error in the running direction of the recording paper 41, and the positional deviation ΔW in the direction of width is based upon the positioning error in a direction perpendicular to the running direction of the recording paper 41. When the gap 74 is greater than 0.1 mm, the gap 74 is visually recognized, and thus poor appearance will request.

Now, explanation will be made of the image data extension processing carried out by the two-color data producing device 2 for preventing the generation of the gap 74, with reference to FIGS. 5 to 9.

Figure 6C:
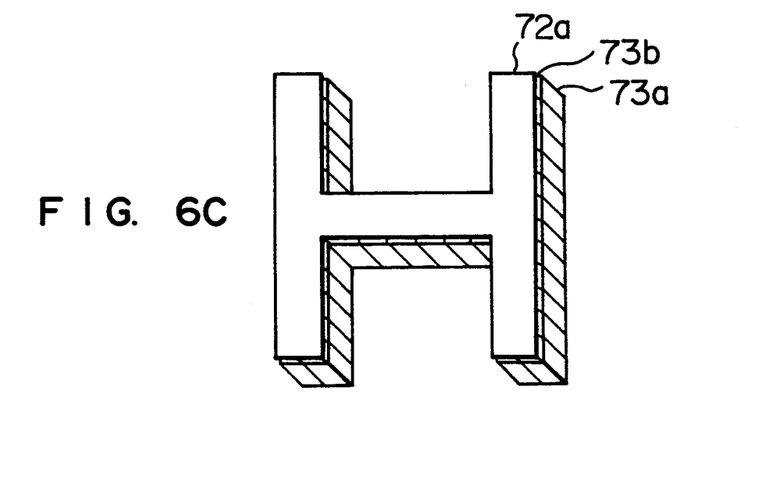
Figure 7:
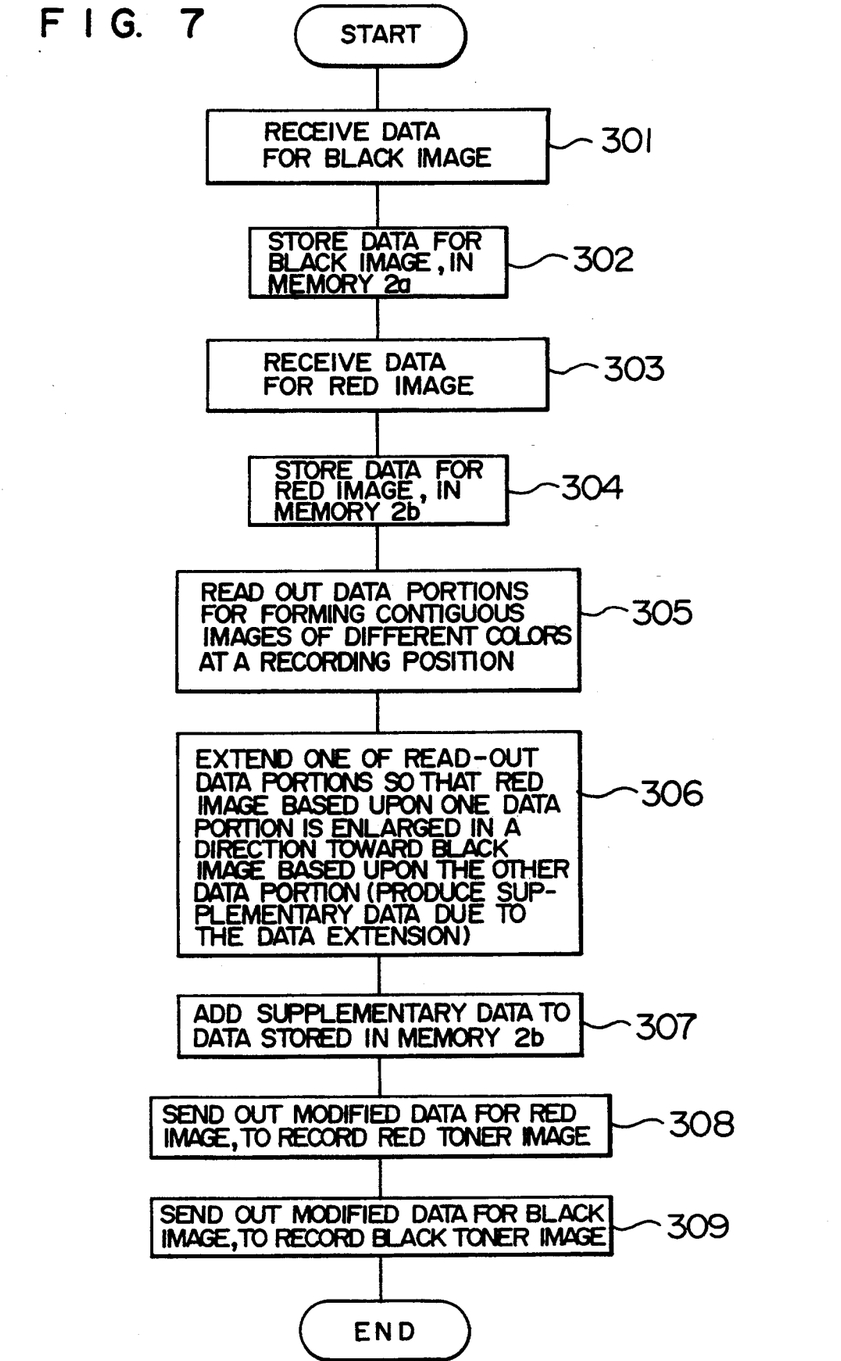
FIG. 7 is a flow chart for explaining the image data extending processing carried out by the two-color data producing device of FIG. 5.

As shown in FIG. 7, the two-color data producing device 2 receives image data for forming a black toner image, from the information processor 140 (step 301), and stores the above image data in the memory 2a of FIG. 5 (step 302). Further, the two-color data producing device 2 receives image data for forming a red toner image (step 303), and stores this image data in the memory 2b (step 304). A memory address for reading out an image data portion from the memory 2a or 2b, is specified by the address indicating means 2e. Next, image data portions for forming contiguous toner images of different colors at a recording position are read out from the memories 2a and 2b, and are sent to the accumulator 2f to check whether or not contiguous pixels can be formed by the read-out image data portions (step 305). After the above check operation has been performed at the whole area of the recording position, the image data portion for forming a red toner image is extended by the data extension means 2g so that the red toner image based upon the above image data portion is enlarged in a direction toward the black toner image based upon the other image data portion (step 306). A supplementary image data portion obtained by the extension processing is stored in the memory 2b together with the original image data portion for forming a red toner image (step 307). Modified image data thus obtained for forming a red toner image is read out from the memory 2b, and is sent to the recording apparatus 1 (step 308). Further, the image data for forming a black toner image is sent from the memory 2a to the recording apparatus 1 (step 309). Thus, two toner images can be recorded as shown in FIG. 6C. Referring to FIG. 6C, an additional red toner image 73b based upon the supplementary image data portion which is obtained by the data extension processing in the two-color data producing device 2, is recorded together with two toner images 72a and 73a based upon image data which is formed by the information processor 140. Thus, a gap between the black toner image 72a and the red toner image 73a is eliminated. In a case where the toner images 72a and 73a are accurately contiguous to each other, the additional red toner image 73b and the black toner image 72a overlap each other. However, it is not easy to discriminate the overlapping portion visually from the black toner image 72a. Thus, a recording image will not provide a poor appearance.

The change of a toner image recording area based upon the image data extension processing will be explained in more detail, with reference to FIGS. 8A to 9D.

Figure 8A:
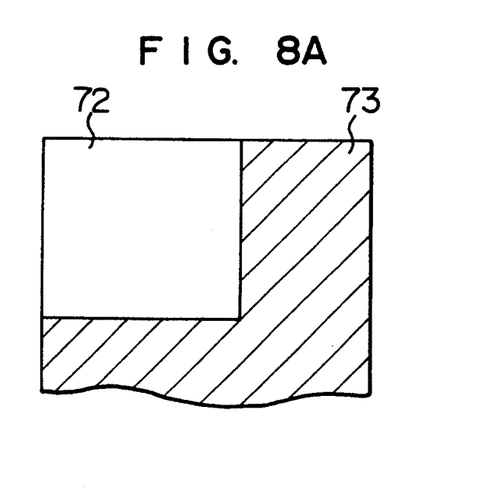
FIGS. 8A to 8D are schematic diagrams for indicating that the two-dimensional deviation between two recording images can be allowed by the present invention.
Figure 8B:
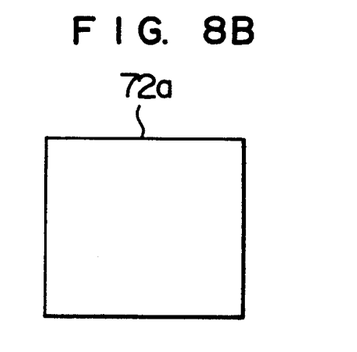

FIGS. 8A to 8D show a case where image data for forming a red toner image is extended so that the red toner image based upon the image data is enlarged in a lengthwise direction and in the direction of width. The information processor 140 forms contiguous images 72 and 73 shown in FIG. 8A. The two-color data producing device 2 does not carry out extension processing for image data which is used for forming a black toner image. Thus, image data stored in the memory 2a for forming the black toner image is kept as it is. Accordingly, the black toner image 72a recorded on the basis of the above image data is the same as the image 72 formed by the information processor 140, as shown in FIG. 8B.

Figure 8C:
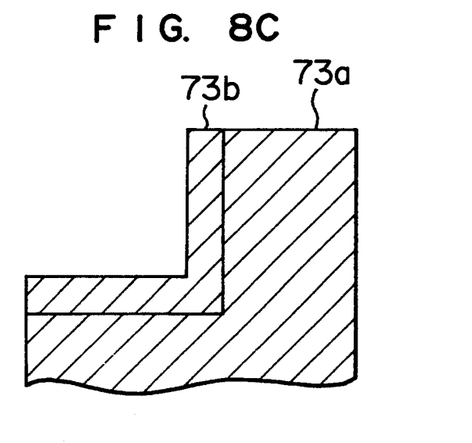

However, image data for forming a red toner image contiguous to the black toner image is extended by the two-color data producing device 2. That is, the image data read out from the memory 2b is extended so that the red toner image based upon the image data is enlarged in a direction toward the black toner image. Thus, as shown in FIG. 8C, a red toner image based upon the modified red image data includes the red toner image 73a corresponding to the image 73 which is formed by the information processor 140, and the additional red toner image 73b based upon supplementary red image data which is obtained by the extension processing in the two-color data producing device 2.

Figure 8D:
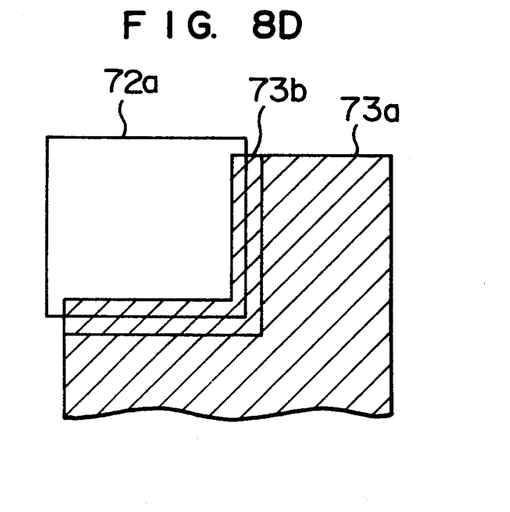

When the toner images 72a, 73a and 73b are transferred to the recording paper 41, a gap between the toner images 72a and 73a caused by the positional deviation is filled up with the additional red toner image 73b. In this case, the overlapping portion of the black toner image 72a and the additional red toner image 73 is not black in a strict sense, but looks black in practice.

In a recording apparatus where the recording paper 41 is electrostatically attracted by the transfer belt 51 or a transfer drum, such as the recording apparatus 1, the positional deviation between two toner images is hard to generate in the direction of width, and readily generates in a lengthwise direction (namely, running direction of recording paper). Accordingly, in some cases, it is necessary to extend image data so that a toner image based upon the image data is enlarged only in the lengthwise direction. In such cases, the processing time can be shortened.

Figure 9A:
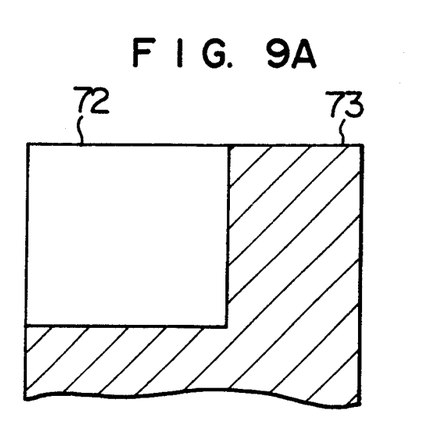
FIGS. 9A to 9D are schematic diagrams for indicating that the one-dimensional deviation between two recording images can be allowed by the present invention.
Figure 9B:
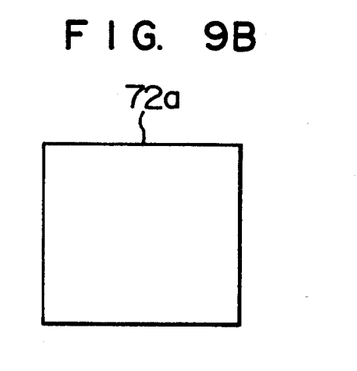
Figure 9C:
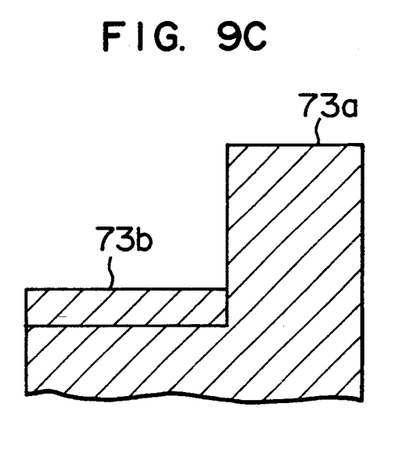
Figure 9D:
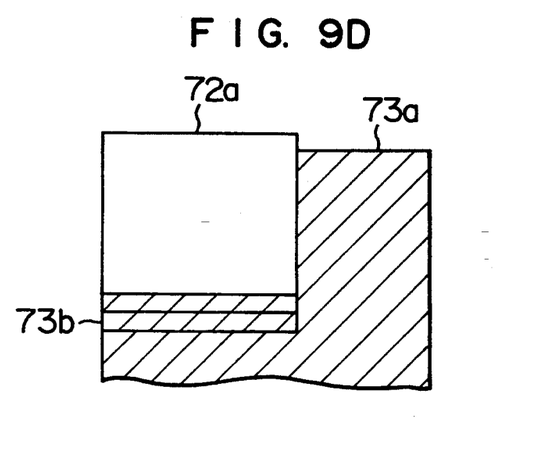

FIGS. 9A to 9D show a case where image data for forming a red toner image is extended so that the red toner image based upon the image data is enlarged only in a lengthwise direction. In more detail, FIG. 9A shows the images 72 and 73 formed by the information processor 140, FIG. 9B shows the black toner images 72a formed on the light-sensitive drum 11, FIG. 9C shows red toner images 73a and 73b formed on the drum 11, and FIG. 9D shows the toner images 72a, 73a and 73b which have been transferred to the recording paper 41.

In the above, explanation has been made of a case where a black toner image and a red toner image are recorded on a sheet of recording paper 41 so that the black and red toner images are contiguous to each other, by way of example. It is needless to say that a toner image of a different color can be recorded in a similar manner.

As mentioned above, the extension processing in the two-color data producing device 2 is carried out for one of two image data. It is advantageous to carry out the extension processing for that one of two image data which will form an image superior in brightness to that formed by the other image data, since a high picture quality can be obtained.

Further, a positional deviation between two recorded images generates in a case where a plurality of recording operations are performed for one sheet of recording paper. Accordingly, the present invention is applicable to all methods of and all apparatuses for recording a color image in the above manner.

The two-color data producing device 2 may be incorporated in the recording apparatus 1 or the information processor 140.

As has been explained in the foregoing, according to the present invention, one of two image data which are to be recorded at adjacent positions, is extended so that two images based upon two image data overlap each other. Thus, even when the positional deviation between contiguous images of different colors is generated so that the images are spaced apart from each other, there is no fear of generating a gap which has the base color of recording paper, between the images.

We claim:

1. An apparatus for producing color image data in response to video signals supplied from an information processor from which two contiguous images of different colors will be recorded by a two-color image recording apparatus on a sheet of recording paper so as to at least partially overlap each other, comprising:

a first video signal storing means for storing first video signals in a form of a pixel bit map representing color image data of a first color image;

a second video signal storing means for storing Second video signals in a form of a pixel bit map representing color image data of a second color image;

contiguous pixel pair detecting means coupled to said first video signal-storing means and said second video signal storing means for extracting a video signal portion of said first color image, which video signal portion represents a part of said first color image which is contiguous to a boundary of said first and second color images;

video signal modifying means coupled to said contiguous pixel pair detecting means for extending the extracted video signal portion of said first color image so as to enlarge said video signal portion by a predetermined amount in a direction of said boundary and for storing the extended video signal portion in said first video signal storing means together with said first video signals; and video signal read-out means for addressing said first video signal storing means and said second video signal storing means to read-out said first and second video signals and said extended video signal portion stored therein to said two-color image recording apparatus for recording said first and second color images on recording paper so as to at least partially overlap each other.

2. An apparatus according to claim 1, wherein said predetermined amount by which said extracted video signal portion is extended by said video signal modifying means corresponds to a gap which may occur between the first and second color images during recording thereof on recording paper by said two-color image recording apparatus.

3. A method of producing color image data in response to video signals supplied from an information processor from which two contiguous images of different colors will be recorded by a two-color image recording apparatus on a sheet of recording paper so as to at least partially overlap each other, comprising the steps of:

storing first video signals representing color image data of a first color image in a first video signal storing means in a form of a pixel bit map;

storing second video signals representing color image data of a second color image in a second video signal storing means in a form of a pixel bit map;

extracting from said first video signal storing means a video signal portion of said first color image which represents a part of said first color image which is contiguous to a boundary of said first and second color images;

extending the extracted video signal portion so as to enlarge said signal portion by a predetermined amount in a direction of said boundary;

storing the extended video signal portion in said first video signal storing means together with said first video signals as a part of said first color image; and reading out said first and second color images from said first and second video signal storing means to said two-color image recording apparatus for recording said first and second color images as toner images on recording paper so that said toner images at least partially overlap each other.

4. A method according to claim 3, wherein said predetermined amount by which said extracted video signal portion is extended by said video signal modifying means corresponds to a gap which may occur between the first and second color images during recording thereof on recording paper by said two-color image recording apparatus.

* * * * *